(12) United States Patent
Strelec et al.

(10) Patent No.: US 9,074,785 B2
(45) Date of Patent: Jul. 7, 2015

(54) OPERATION OF A THERMAL COMFORT SYSTEM

(75) Inventors: Martin Strelec, Chodov (CZ); Karel Marik, Revnice (CZ)

(73) Assignee: Honeywell International Inc., Morristown, NJ (US)

( * ) Notice: Subject to any disclaimer, the term of this patent is extended or adjusted under 35 U.S.C. 154(b) by 406 days.

(21) Appl. No.: 13/559,017

(22) Filed: Jul. 26, 2012

(65) Prior Publication Data

US 2014/0027103 A1 Jan. 30, 2014

(51) Int. Cl.
| G06F 17/10 | (2006.01) |
| F24F 11/00 | (2006.01) |
| G05D 23/19 | (2006.01) |

(52) U.S. Cl.
CPC ............ *F24F 11/0012* (2013.01); *F24F 11/006* (2013.01); *F24F 2011/0063* (2013.01); *G05D 23/1951* (2013.01)

(58) Field of Classification Search
CPC ............................ F24F 11/0012; F24F 11/006
USPC ............................ 703/1, 2; 700/276, 278, 300
See application file for complete search history.

(56) References Cited

U.S. PATENT DOCUMENTS

| 7,142,948 | B2 * | 11/2006 | Metz .............................. 700/276 |
| 8,600,561 | B1 * | 12/2013 | Modi et al. ..................... 700/276 |
| 2007/0227717 | A1 * | 10/2007 | McBroom et al. ............. 165/203 |
| 2009/0030864 | A1 * | 1/2009 | Pednault et al. ................. 706/45 |
| 2010/0211224 | A1 * | 8/2010 | Keeling et al. ................. 700/277 |
| 2010/0262298 | A1 * | 10/2010 | Johnson et al. ................ 700/277 |
| 2012/0085831 | A1 * | 4/2012 | Kopp ........................... 236/46 A |
| 2012/0125559 | A1 * | 5/2012 | Fadell et al. ................... 165/11.2 |
| 2012/0298348 | A1 * | 11/2012 | Mise et al. ..................... 165/287 |
| 2013/0153195 | A1 * | 6/2013 | Wallaert ........................ 165/239 |
| 2013/0255930 | A1 * | 10/2013 | Prakah-Asante et al. ..... 165/203 |
| 2013/0338839 | A1 * | 12/2013 | Rogers et al. ................. 700/278 |
| 2013/0345893 | A1 * | 12/2013 | David et al. .................... 700/300 |

OTHER PUBLICATIONS

Aswani et al. ("Identifying Models of HVAC Systems Using Semiparametric Regression", American Control Conference, Jun. 27-29, 2012, pp. 3675-3680).*
Freire et al. ("Development of regression equations for predicting energy and hygrothermal performance of buildings", Elsevier B.V., 2007, pp. 810-820).*
Xi Xuecheng ("HVAC Control Using Support Vector Regression Models", National University Of Singapore, 2003, pp. 1-97).*

* cited by examiner

*Primary Examiner* — Omar Fernandez Rivas
*Assistant Examiner* — Iftekhar Khan
(74) *Attorney, Agent, or Firm* — Brooks, Cameron & Huebsch, PLLC

(57) ABSTRACT

Systems, methods, and devices for operation of a thermal comfort system are described herein. For example, one or more embodiments include receiving data, including a target temperature for a zone, an actual temperature of the zone, and an ambient temperature of air being supplied to a thermal comfort system, and determining, through a regression model, from the received data, a calculated time when the zone will reach the target temperature upon operation of the thermal comfort system.

18 Claims, 3 Drawing Sheets

US 9,074,785 B2

OPERATION OF A THERMAL COMFORT SYSTEM

TECHNICAL FIELD

The present disclosure relates to operation of a thermal comfort system.

BACKGROUND

Heating, ventilation, and air conditioning (HVAC) systems can be used to maintain temperatures of zones (e.g., rooms, hallways). The HVAC system can include a heating and/or cooling unit in communication with a sensor and/or user interface (e.g., thermostat), which can be used to control the HVAC system.

The HVAC system can be programmed to cool and/or heat a zone to a particular temperature during a particular time of day. In an example, during a period of the day when the zone is unoccupied, the HVAC system can be set to a passive mode, in which minimal cooling and/or heating is performed by the HVAC system. This can allow for the temperature of the zone to drop and/or rise.

When the zone becomes occupied, it can be desirable to cool and/or heat the zone to a particular temperature that is within a thermal comfort zone. As such, energy can be saved on cooling and/or heating when the zone is unoccupied. Alternatively, and/or in addition, the zone can be maintained at a temperature in the thermal comfort zone when the zone is occupied.

However, challenges can be associated with bringing the zone to a temperature within the thermal comfort zone at a time when the zone becomes occupied. For example, in a zone that is being heated, the temperature can be increased to a temperature that is above a minimum temperature of the thermal comfort zone, at the moment the zone becomes occupied and/or at a moment before the zone becomes occupied, thus wasting energy. Alternatively, and/or in addition, the temperature may not reach a minimum temperature of the thermal comfort zone at the moment the zone becomes occupied, which can cause discomfort to the occupants of the zone.

DETAILED DESCRIPTION

Figure 1:
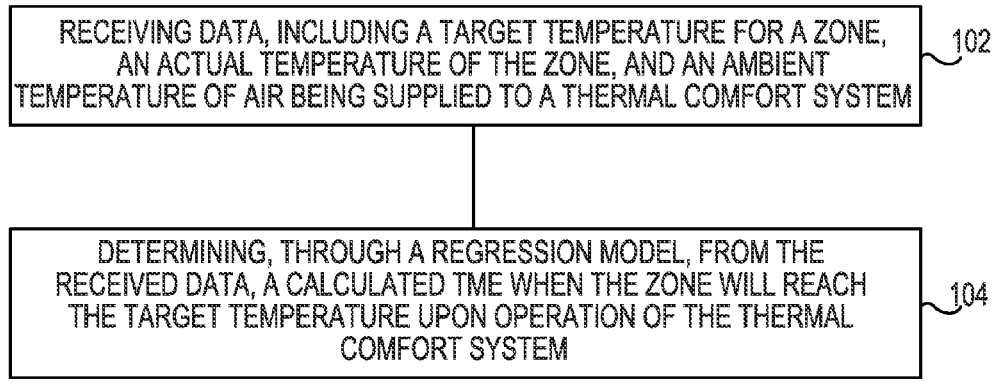
FIG. 1 illustrates a method according to one or more embodiments of the present disclosure.

Systems, methods, and devices for operation of a thermal comfort system are described herein. For example, one or more embodiments include receiving data, including a target temperature for a zone, an actual temperature of the zone, and an ambient temperature of air being supplied to a thermal comfort system, and determining, through a regression model, from the received data, a calculated time when the zone will reach the target temperature upon operation of the thermal comfort system.

Thermal comfort systems (e.g., HVAC systems) can cool and/or heat zones to a desired temperature. However, use of the thermal comfort system can require a substantial amount of energy. As such, it can be desirable to reduce the operation of the HVAC system during periods of time when a zone is not occupied, allowing the temperature to fluctuate.

When occupants enter the zone, the zone can then be cooled and/or heated to a temperature within a thermal comfort zone, which can be defined as a range of temperatures that are comfortable to an individual. However, if cooling and/or heating is not started at a correct time, the temperature of the zone may not have reached the temperature in the thermal comfort zone when occupants enter the zone. This can result in a zone that is too warm and/or cold and/or result in excess energy being used to heat the zone. Alternatively, and/or in addition, if cooling and/or heating is not started at a correct time, the zone can be heated and/or cooled to a temperature within the thermal comfort zone prior to the zone being occupied, which can result in excess energy being used.

For example, the cooling can be performed for a period of time that cools the zone to a temperature below the thermal comfort zone, resulting in discomfort to an individual and wasted energy. Alternatively, and/or in addition, heating can be performed for a period of time that heats the zone to a temperature that is above the thermal comfort zone, resulting in discomfort to an individual and wasted energy.

Some embodiments of the present disclosure can provide a regression model that can be used in determining when the zone will reach the target temperature upon operation of the thermal comfort system. In an example, the regression model can use three inputs, a target temperature for a zone, an actual temperature of the zone, and an ambient temperature of air being supplied to a thermal comfort system. As such, a reduced number of sensors can be used.

In some embodiments, a structure of the regression model can be changed, without affecting the remaining parts of the regression model. For example, a variable for a temperature of media provided to the thermal comfort system can be added to the regression model, without changing the remaining parts of the regression model.

In some embodiments, the regression model can be updated with data from each run cycle (e.g., heating and/or cooling cycle) of the thermal comfort system. As such, by updating the regression model with data from each run cycle, a more accurate value can be determined for the time when the zone will reach the target temperature upon operation of the thermal comfort system because actual feedback (e.g., data from each run cycle) can be used to update the regression model.

In some embodiments, the regression model does not need historical data to operate when no measured data is available. For example, a cooling and/or heating rate associated with the thermal comfort system can be used to calculate an initial time for when the zone will reach the target temperature upon operation of the thermal comfort system.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing.

As will be appreciated, elements shown in the various embodiments herein can be added, exchanged, and/or eliminated so as to provide a number of additional embodiments of the present disclosure. As used herein, "a number of" refers to one or more. In addition, as will be appreciated, the proportion and the relative scale of the elements provided in the figures are intended to illustrate the embodiments of the present invention, and should not be taken in a limiting sense.

FIG. 1 illustrates a method according to one or more embodiments of the present disclosure. At block 102, the method can include receiving data, including a target temperature for a zone, an actual temperature of the zone, and an ambient temperature of air being supplied to a thermal comfort system. The target temperature for the zone can be defined as the desired temperature of the zone at a particular time. The target temperature can be received through a user interface of a temperature control system. For example, the target temperature can be programmed into a thermostat in communication with the thermal comfort system.

The actual temperature of the zone can be defined as the temperature that the zone is at when measured by a sensor. The ambient temperature of air being supplied to the thermal comfort system can be defined as the temperature of air that is entering an intake of the thermal comfort system. The actual temperature of the zone and/or the ambient temperature of air being supplied to the thermal comfort system can be measured by a temperature sensor, which can be in communication with the temperature control system.

The method can include determining, through a regression model, from the received data, a calculated time when the zone will reach the target temperature upon operation of the thermal comfort system, at block 104. In an example, the regression model can be represented, in its general form, as:

$$t_{pred} = \sum_{i=1}^{nT_a} (T_{aT} - T_a)^i \cdot p_i + \sum_{i=1}^{nT_o} (T_{aT} - T_o)^i \cdot p_{nTa+i} + \sum_{i=1}^{nT_m} (T_{aT} - T_m)^i \cdot p_{nTa+nTo+i} + \sum_{i=1}^{nConst} p_{nTa+nTo+nTm},$$

In an example, $t_{pred}$ can be the calculated time when the zone will reach the target temperature. For example, upon operation of the thermal comfort system, the zone can be cooled and/or heated by the thermal comfort system for the calculated time, such that the zone will reach the target temperature within the calculated time.

$T_{aT}$ can be the target temperature for the zone. For example, as discussed herein, the target temperature for the zone can be defined as the desired temperature of the zone at a particular time. $T_a$ can be the actual temperature of the zone. For example, as discussed herein, the actual temperature of the zone can be defined as the temperature that the zone is at when measured by a sensor. $T_o$ can be the ambient temperature of air being supplied to the thermal comfort system.

$p_i$, $p_{nTa+i}$, $p_{nTA+nTo+i}$, and $p_{nTa+nTo+nTm}$ can be the coefficients of the regression model. $T_m$ can be the temperature of media supplied to the thermal comfort system. In an example, the media can be the heating and/or cooling fluid that is provided to the thermal comfort system. For instance, the media can be cooled and/or heated to provide for the transfer of heat through a radiator, for example.

$nT_a$, $nT_o$, and $nT_m$ can be the orders of polynomials of the regression model. nConst can be a constant. For example, nConst can have a value of 0 and/or 1.

In an example, the regression model can be reduced to:

$$t_{pred} = (T_{aT} - T_a) \cdot p_1 + (T_{aT} - T_a)^2 \cdot p_2 + (T_{aT} - T_o) \cdot p_3 + p_4,$$

and can be used for calculating the time when the zone will reach the target temperature. $t_{pred}$ can be the calculated time when the zone will reach the target temperature; $T_{aT}$ can be the target temperature for the zone; $T_a$ can be the actual temperature of the zone; $T_o$ can be the ambient temperature of air being supplied to the thermal comfort system; and $p_1$, $p_2$, $p_3$, and $p_4$ can be coefficients of the regression model.

The method can include initializing the regression model by setting $p_2$, $p_3$, and $p_4$ to zero and entering a cooling rate of the thermal comfort system (e.g., five degrees Fahrenheit per hour) for $p_i$; and solving for $t_{pred}$ to obtain an initial calculated cooling time when the zone will reach the target temperature. As such, the regression model can be initialized by specifying the target temperature for the zone, the actual temperature of the zone, and the cooling rate of the thermal comfort system.

In this example, the cooling rate can be inserted into the equation for $p_1$ when the target temperature for the zone is lower than the actual temperature of the zone (e.g., when it is desired to cool the zone to the target temperature for the zone from the actual temperature of the zone). Multiplying the difference in temperature between the target temperature for the zone and the actual temperature of the zone by the cooling rate of the thermal comfort system can provide an initial time (e.g., $t_{pred}$) for how long to operate the thermal comfort system to reach the target temperature for the zone.

Alternatively, and/or in addition, the method can include initializing the regression model by setting $p_2$, $p_3$, and $p_4$ to zero and entering a heating rate of the thermal comfort system (e.g., five degrees Fahrenheit per hour) for $p_1$; and solving for $t_{pred}$ to obtain an initial calculated heating time when the zone will reach the target temperature. As such, the regression model can be initialized by specifying the target temperature for the zone, the actual temperature of the zone, and the heating rate of the thermal comfort system.

In this example, the heating rate can be inserted into the equation for $p_1$ when the target temperature for the zone is greater than or equal to the actual temperature of the zone (e.g., when it is desired to heat the zone to the target temperature for the zone from the actual temperature of the zone). Multiplying the difference in temperature between the target temperature for the zone and the actual temperature of the zone by the heating rate of the thermal comfort system can provide an initial calculated time for how long to operate the thermal comfort system to reach the target temperature for the zone.

In some embodiments, the method can include operating the thermal comfort system for the initial calculated time when the zone will reach the target temperature. In an example, the thermal comfort system can heat and/or cool the zone at the heating and/or cooling rate for the initial calculated time when the zone will reach the target temperature.

The method can include receiving updated values for an actual time for the zone to reach the target temperature, the actual temperature of the zone, and the ambient temperature of air being supplied to the thermal comfort system upon operation of the thermal comfort system. For example, the initial calculated time may vary from the actual time for the zone to reach the target temperature. As such, the actual time for the zone to reach the target temperature can be recorded, for example. Alternatively, and/or in addition, the actual temperature of the zone and the ambient temperature of air being supplied to the thermal comfort system can vary and can be recorded, for example.

In some embodiments, the method can include solving for $p_1$, $p_2$, $p_3$, and $p_4$ using the target temperature for the zone and the updated values for the actual time for the zone to reach the target temperature, the actual temperature of the zone, and the ambient temperature of air being supplied to the thermal comfort system. For example, the target temperature for the zone and the updated values for the actual time for the zone to reach the target temperature, the actual temperature of the zone, and the ambient temperature of air being supplied to the thermal comfort system can be inserted into the equation and a recursive least squares method can be used to solve for $p_1$, $p_2$, $p_3$, and $p_4$.

Upon solving for $p_1$, $p_2$, $p_3$, and $p_4$, the target temperature for the zone, the actual temperature of the zone, and the ambient temperature of air being supplied to the thermal comfort system, as well as the solved values for $p_1$, $p_2$, $p_3$, and $p_4$ can be inserted into the regression model and an updated time for the zone to reach the target temperature can be calculated. As such, the thermal comfort system can be operated for the updated time for the zone to reach the target temperature.

In some embodiments, the method can include updating at least one of the coefficients of the regression model with each run cycle of the thermal comfort system. A run cycle of the thermal comfort system can be defined as the thermal comfort system running for the calculated time when the zone will reach the target temperature. In an example, upon the thermal comfort system running for the calculated time when the zone will reach the target temperature, data can be received by the thermal comfort system.

For instance, updated values for an actual time for the zone to reach the target temperature, the actual temperature of the zone, and the ambient temperature of air being supplied to the thermal comfort system upon operation of the thermal comfort system can be received. This data can be used to update at least one of the coefficients of the regression model to more accurately calculate the time when the zone will reach the target temperature during the next run cycle.

Updating at least one of the coefficients of the regression model can include determining a covariance matrix for the regression model and selecting eigenvalues of the covariance matrix to adjust when at least one of the coefficients of the regression model is updated. In an example, a preference method can be used for determining which coefficient of the regression model can be updated first.

In an example, an eigenvalue associated with $(T_{aT}-T_a)$ can be selected that is larger than an eigenvalue associated with $(T_{aT}-T_a)^2$ and $(T_{aT}-T_o)$. As such, the coefficient of the regression model associated with $(T_{aT}-T_a)$ (e.g., $p_1$) can be updated sooner than the coefficients of the regression model associated with $(T_{aT}-T_a)^2$ (e.g., $p_2$) and $(T_{aT}-T_o)$ (e.g., $p_3$), because the eigenvalue associated with $(T_{aT}-T_a)$ and the coefficient of the regression model $p_1$ is larger, relative to eigenvalues associated with remaining coefficients of the regression model (e.g., $p_2$, $p_3$).

In an example, the eigenvalue associated with $(T_{aT}-T_a)$ can be $10^{24}$, the eigenvalue associated with $(T_{aT}-T_a)^2$ can be $10^{12}$ and the eigenvalue associated with $(T_{aT}-T_o)$ can be $10^{12}$. As such, the coefficient of the regression model associated with $(T_{aT}-T_a)$ can be updated sooner than coefficients of the regression model associated with $(T_{aT}-T_a)^2$ and $(T_{aT}-T_o)$. In an example, the update of the coefficient of the regression model associated with $(T_{aT}-T_a)$ can be proportional to the eigenvalue associated with $(T_{aT}-T_a)$. For example, when the eigenvalue associated with $(T_{aT}-T_a)$ is $10^{24}$, the update of the coefficient of the regression model associated with $(T_{aT}-T_a)$ can be $10^{12}$ times larger than an update of the coefficients of the regression model associated with $(T_{aT}-T_a)^2$ and $(T_{aT}-T_o)$, which have associated eigenvalues of $10^{12}$, for example.

Alternatively, and/or in addition, a dispreference method can be used for determining which coefficient of the regression model can be updated first. For example, an eigenvalue associated with $(T_{aT}-T_a)^2$ can be selected that is smaller than an eigenvalue associated with $(T_{aT}-T_a)$ and $(T_{aT}-T_o)$. As such, the coefficient of the regression model associated with $(T_{aT}-T_a)^2$ (e.g., $p_2$) can be updated later than coefficients of the regression model associated with $(T_{aT}-T_a)$ (e.g., $p_1$) and $(T_{aT}-T_a)$ (e.g., $p_3$), because the eigenvalue associated with $(T_{aT}-T_a)^2$ and the coefficient of the regression model $p_2$ is smaller, relative to eigenvalues associated with remaining coefficients of the regression model (e.g., $p_1$, $p_3$).

In an example, the eigenvalue associated with $(T_{aT}-T_a)^2$ can be $10^{-3}$, the eigenvalue associated with $(T_{aT}-T_a)$ can be $10^{12}$ and the eigenvalue associated with $(T_{aT}-T_o)$ can be $10^{12}$. As such, the coefficient of the regression model associated with $(T_{aT}-T_a)^2$ can be updated later than the coefficients of the regression model associated with $(T_{aT}-T_a)$ and $(T_{aT}-T_o)$.

Figure 2:
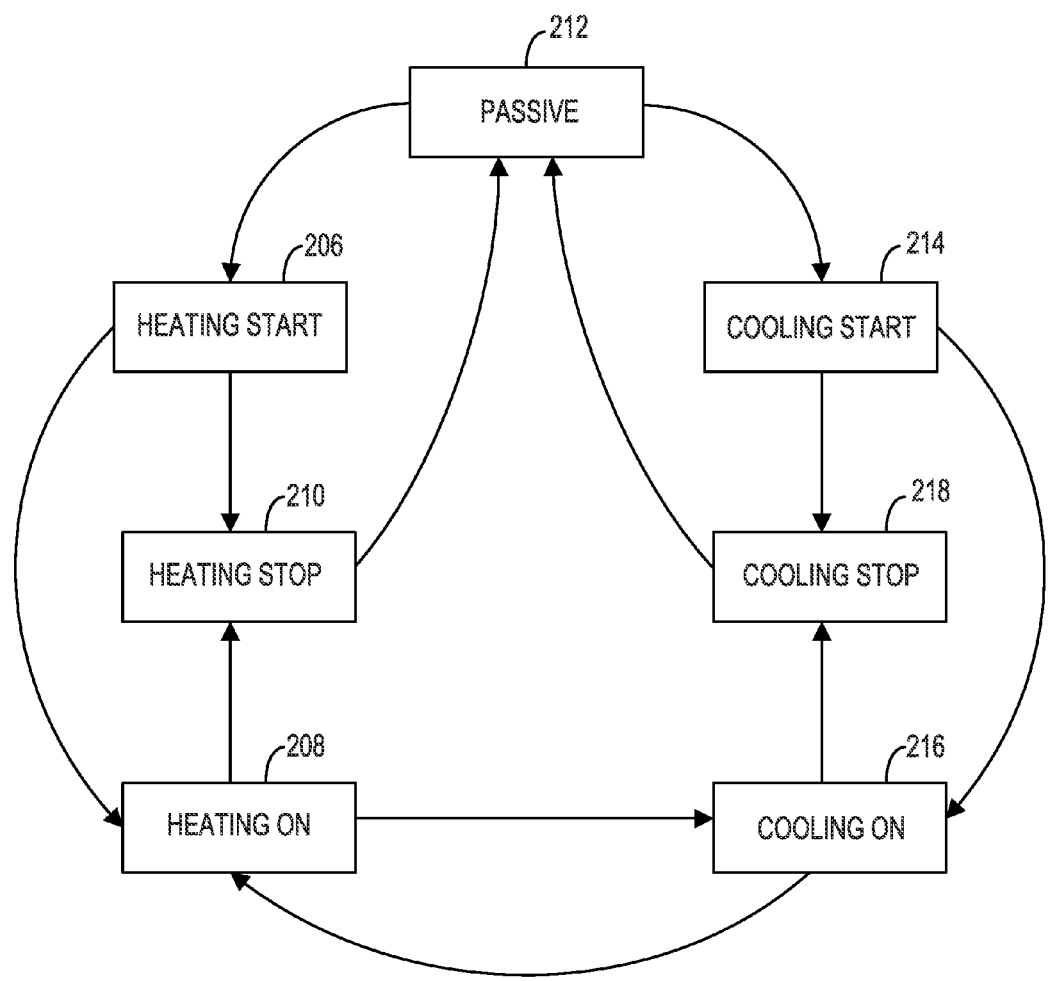
FIG. 2 illustrates a flow chart according to one or more embodiments of the present disclosure.

FIG. 2 illustrates a flow chart according to one or more embodiments of the present disclosure. In an example, the flow chart can include different modes (e.g., 206 to 218) in a cooling and/or heating run cycle of the thermal comfort system. For example, the heating run cycle of the thermal comfort system can include a heating start mode 206, heating on mode 208, and a heating stop mode 210. Alternatively, and/or in addition, the cooling run cycle of the thermal comfort system can include a cooling start mode 214, a cooling on mode 216, and a cooling stop mode 218, for example. Both the heating and cooling run cycle can include a passive mode 212, for example.

As discussed herein, a calculated time when the zone will reach the target temperature upon operation of the thermal comfort system can be calculated. As such, a calculated heating and/or cooling start time can be calculated and/or a calculated heating and/or cooling stop time can be calculated that define a range of the calculated time when the zone will reach the target temperature and the period of time when the thermal comfort system is operated.

In some embodiments, when the time is greater than or equal to a calculated heating start time of the thermal comfort system, the thermal comfort system can transition from passive mode 212 to heating start mode 206 and data can be received by the thermal comfort system and stored. For example, the actual temperature of the zone, the ambient temperature of air being supplied to the thermal comfort system, and/or the temperature of media supplied to the thermal comfort system can be recorded. The heating start mode 206 can be defined as a mode where operational components of the thermal comfort system are activated (e.g., heating element, fan).

In some embodiments, upon transitioning into the heating start mode 206, the thermal comfort system can enter heating on mode 208, which can be defined as a mode where operational components of the thermal comfort system have reached a steady state, for example. In an example, when the is thermal comfort system is in the heating start mode 206 and/or the heating on mode 208, the actual temperature of the zone can be greater than or equal to the target temperature for the zone, and the regression model, as discussed in relation to FIG. 1, can be updated.

Alternatively, and/or in addition, upon transitioning into the heating start mode 206, the thermal comfort system can transition into heating stop mode 210, which can be defined as a mode where the thermal comfort system stops heating. In an example, the thermal comfort system can transition into heating stop mode 210, from heating start mode 206, when the actual time is greater than or equal to the calculated heating stop time.

In some embodiments, when the time is greater than or equal to the calculated heating stop time, the thermal comfort system can transition from heating on mode 208 to heating stop mode 210. Alternatively, and/or in addition, data can be received by the thermal comfort system and stored. For example, the actual temperature of the zone, the ambient temperature of air being supplied to the thermal comfort system, and/or the temperature of media supplied to the thermal comfort system can be recorded.

In some embodiments, when the actual temperature of the zone is less than or equal to the target temperature of the zone, the thermal comfort system can transition from heating stop mode 210 to passive mode 212. Alternatively, and/or in addition, the regression model can be updated, as discussed in relation to FIG. 1. When the thermal comfort system enters passive mode 212, the system can perform minimal and/or no heating, allowing the actual temperature of the zone to fluctuate.

In some embodiments, when the time is greater than or equal to a calculated cooling start time of the thermal comfort system, the thermal comfort system can transition from passive mode 212 to cooling start mode 214 and data can be received by the thermal comfort system and stored. For example, the actual temperature of the zone, the ambient temperature of air being supplied to the thermal comfort system, and/or the temperature of media supplied to the thermal comfort system can be recorded. The cooling start mode 214 can be defined as a mode where operational components of the thermal comfort system are activated (e.g., cooling element, fan).

In some embodiments, upon transitioning into the cooling start mode 214, the thermal comfort system can enter cooling on mode 216, which can be defined as a mode where operational components of the thermal comfort system (e.g., cooling elements) have reached a steady state with regard to temperature. In an example, when the thermal comfort system is in the cooling start mode 214 and/or the cooling on mode 216, the actual temperature of the zone can be less than the target temperature for the zone, and the regression model, as discussed in relation to FIG. 1, can be updated.

Alternatively, and/or in addition, upon transitioning into the cooling start mode 214, the thermal comfort system can transition into cooling stop mode 218, which can be defined as a mode where the thermal comfort system stops cooling. In an example, the thermal comfort system can transition into cooling stop mode 218, from cooling start mode 214, when the actual time is greater than or equal to the calculated cooling stop time.

In some embodiments, when the time is greater than or equal to the calculated cooling stop time, the thermal comfort system can transition from cooling on mode 216 to cooling stop mode 218. Alternatively, and/or in addition, data can be received by the thermal comfort system and stored. For example, the actual temperature of the zone, the ambient temperature of air being supplied to the thermal comfort system, and/or the temperature of media supplied to the thermal comfort system can be recorded.

In some embodiments, when the actual temperature of the zone is greater than or equal to the target temperature of the zone, the thermal comfort system can transition from cooling stop mode 218 to passive mode 212. Alternatively, and/or in addition, the regression model can be updated, as discussed in relation to FIG. 1. When the thermal comfort system enters passive mode 212, the system can perform minimal and/or no cooling, which can allow the actual temperature of the zone to fluctuate.

In some embodiments, when the actual temperature of the zone is greater than or equal to a cooling set point (e.g., temperature in which cooling on mode 216 is activated), the thermal comfort system can transition from heating on mode 208 to cooling on mode 216, for example. Alternatively, and/or in addition, when the actual temperature of the zone is less than or equal to a heating set point (e.g., temperature in which heating on mode 208 is activated), the thermal comfort system can transition from cooling on mode 216 to heating on mode 208, for example.

Some embodiments of the present disclosure can include a system. The system can include a processing resource in communication with a non-transitory computer-readable medium, as discussed in relation to FIG. 3. The computer-readable medium can contain a set of instructions, which can be executed by the processing resource to receive a target temperature for a zone, an actual temperature of the zone, and/or an ambient temperature of air being supplied to a thermal comfort system. As discussed herein, the target temperature for the zone, the actual temperature of the zone, and/or the ambient temperature of air being supplied to a thermal comfort system can be measured by temperature sensors and/or can be received by the thermal comfort system.

The instructions can be executed to determine, from the target temperature for the zone, the actual temperature of the zone, and the ambient temperature of air being supplied to the thermal comfort system, a calculated time when the zone will reach the target temperature upon operation of the thermal comfort system. In an example, the regression model discussed in relation to FIG. 1 can be used to determine the calculated time when the zone will reach the target temperature upon operation of the thermal comfort system.

In some embodiments, the regression model can be updated with each run cycle of the thermal comfort system. For example, data can be recorded by the thermal comfort system, such as an actual time for the zone to reach the target temperature, the actual temperature of the zone, and/or the ambient temperature of air being supplied to the thermal comfort system upon operation of the thermal comfort system. The recorded data can be inserted into the regression model and used to update the coefficients of the regression model, as discussed in relation to FIG. 1. As such, the regression model can be updated, which can allow for a more accurate determination of when the zone will reach the target temperature upon operation of the thermal comfort system.

In some embodiments, upon the determination of the calculated time when the zone will reach the target temperature, the thermal comfort system can be operated for the calculated time. In an example, the thermal comfort system can include a clock and/or timer, which can be used to determine when the thermal comfort system should be operated.

Figure 3:
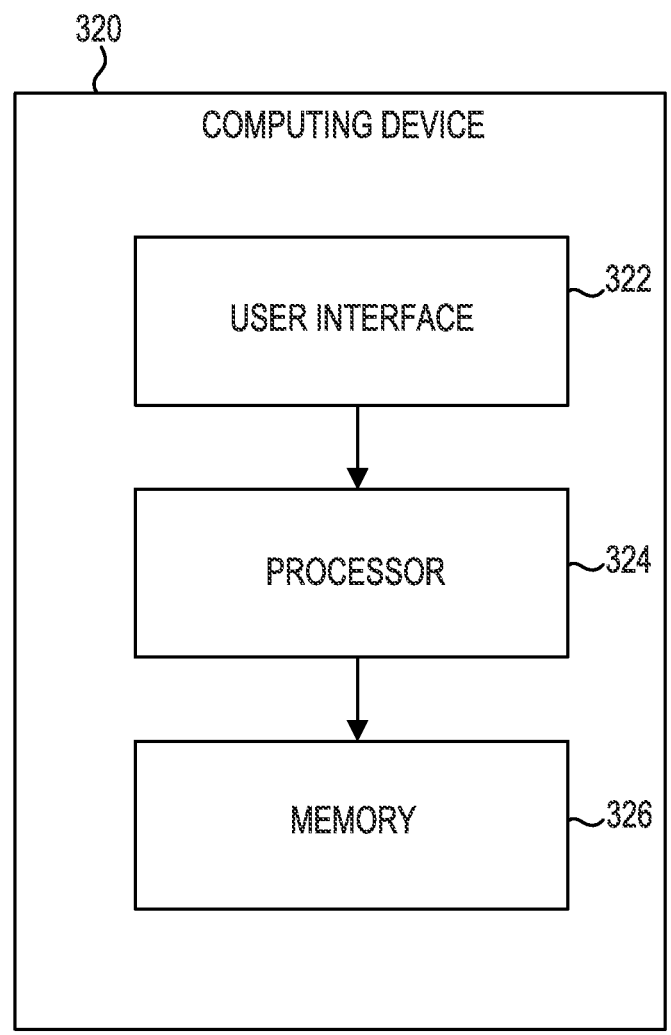
FIG. 3 illustrates a computing device according to one or more embodiments of the present disclosure.

FIG. 3 illustrates a computing device for operation of a thermal comfort system according to one or more embodiments of the present disclosure. Computing device 320 can be used to perform the method as discussed in relation to FIG. 1. As shown in FIG. 3, computing device 320 includes a user interface 322. User interface 322 can be a graphic user interface (GUI) that can provide (e.g., display and/or present) and/or receive information (e.g., data and/or images) to and/or from a user (e.g., operator) of computing device 320. For example, user interface 322 can include a screen that can provide information to a user of computing device 320 and/or receive information entered into a display on the screen by the user. However, embodiments of the present disclosure are not limited to a particular type of user interface.

As shown in FIG. 3, computing device 320 includes a processor 324 and a memory 326 coupled to the processor 324. Memory 326 can be volatile or nonvolatile memory. Memory 326 can also be removable (e.g., portable) memory, or non-removable (e.g., internal) memory. For example, memory 326 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 326 is illustrated as being located in computing device 320, embodiments of the present disclosure are not so limited. For example, memory 326 can also be located internal to another computing resource (e.g., enabling computer readable instructions to be downloaded over the Internet or another wired or wireless connection). Memory 326 can also store executable instructions, such as, for example, computer readable instructions (e.g., software), for operation of the thermal comfort system according to one or more embodiments of the present disclosure.

Processor 324 can execute the executable instructions stored in memory 326 in accordance with one or more embodiments of the present disclosure. For example, processor 324 can execute the executable instructions stored in memory 326 to receive a target temperature for a zone, an actual temperature of the zone, an ambient temperature of air being supplied to a thermal comfort system, and a temperature of media supplied to the thermal comfort system. The target temperature for the zone can be received through user interface 322, for example.

In some embodiments, processor 324 can execute the executable instructions stored in memory 326 to determine, from the received target temperature for the zone, the actual temperature of the zone, the ambient temperature of air being supplied to the thermal comfort system, and a temperature of a media supplied to the thermal comfort system, a calculated time when the zone will reach the target temperature upon operation of the thermal comfort system.

In some embodiments, the processor 324 can execute the executable instructions stored in memory 326 to determine the calculated time through the regression model:

$$t_{pred} = \sum_{i=1}^{nT_a} (T_{aT} - T_a)^i \cdot p_i + \sum_{i=1}^{nT_o} (T_{aT} - T_o)^i \cdot p_{nTa+i} + \sum_{i=1}^{nT_m} (T_{aT} - T_m)^i \cdot p_{nTa+nTo+i} + \sum_{i=1}^{nConst} p_{nTa+nTo+nTm},$$

In an example, $t_{pred}$ can be the calculated time when the zone will reach the target temperature. $T_{aT}$ can be the target temperature for the zone. $T_a$ can be the actual temperature of the zone. $T_o$ can be the ambient temperature of air being supplied to the thermal comfort system.

$p_i$, $p_{nTa+i}$, $p_{nTA+nTo+i}$, and $p_{nTa+nTo+nTm}$ can be the coefficients of the regression model. $T_m$ can be the temperature of media supplied to the thermal comfort system. $nT_a$, $nT_o$, and $nT_m$ can be the orders of polynomials of the regression model. nConst can be a constant. For example, nConst can have a value of 0 and/or 1.

In some embodiments, processor 324 can execute the executable instructions stored in memory 326 to determine an initial calculated time when the zone will reach the target temperature by setting $p_{nTa+i}$, $p_{nTA+nTo+i}$, and $p_{nTa+nTo+nTm}$ to a value of zero and entering at least one of a heating rate and cooling rate of the thermal comfort system for $p_i$, as discussed in relation to FIG. 1. In an example, the initial calculated time can be used to provide a time for the thermal comfort system to run during a first run cycle. For instance, the first run cycle can be completed after the thermal comfort system is installed.

In some embodiments, processor 324 can execute the executable instructions stored in memory 326 to receive updated values for an actual time for the zone to reach the target temperature, the actual temperature of the zone, the ambient temperature of air being supplied to the thermal comfort system, and the temperature of the media supplied to the thermal comfort system. In an example, the updated values can be received after the first run cycle and/or before and/or after consecutive run cycles. Processor 324 can execute the executable instructions stored in memory 326 to solve for $p_i$, $p_{nTa+i}$, $p_{nTA+nTo+i}$, and $p_{nTa+nTo+nTm}$, based on the received updated values, using a recursive least squares method, as discussed in relation to FIG. 1.

In some embodiments, processor 324 can execute the executable instructions stored in memory 326 to determine a covariance matrix for the regression model, as discussed in relation to FIG. 1. In an example, at least one of the coefficients of the regression model can be updated by performing a comparison of a size of eigenvalues in the covariance matrix.

A dispreference method can be used for updating the coefficients of the regression model, wherein the coefficient of the regression model associated with the smallest eigenvalue is updated after the other coefficients of the regression model associated with larger eigenvalues. Alternatively, and/or in addition, a preference method can be used for updating the coefficients of the regression model, wherein the coefficient of the regression model associated with the largest eigenvalue is updated after the other coefficients of the regression model associated with smaller eigenvalues.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A method, comprising:
   receiving data, including a target temperature for a zone, an actual temperature of the zone, and an ambient temperature of air being supplied to the thermal comfort system;
   initializing a regression model by:
   setting a coefficient to zero; and
   entering a heating rate of the thermal comfort system;

determining, through the regression model, from the received data, a calculated time when the zone will reach the target temperature upon operation of the thermal comfort system;

wherein the calculated time when the zone will reach the target temperature is defined by:

$$t_{pred} = (T_{aT} - T_a) \cdot p_1 + (T_{aT} - T_a)^2 \cdot p_2 + (T_{aT} - T_o) \cdot p_3 + p_4,$$

$t_{pred}$ is the calculated time when the zone will reach the target temperature;
$t_{aT}$ is the target temperature for the zone;
$T_a$ is the actual temperature of the zone;
$T_o$ is the ambient temperature of air being supplied to the thermal comfort system; and
$p_1, p_2, p_3$, and $p_4$ are coefficients of the regression model;
solving for the calculated time when the zone will reach the target temperature in order to obtain an initial calculated heating time for the zone to reach the target temperature;
operating the thermal comfort system for the initial calculated time when the zone will reach the target temperature.

2. The method of claim 1, wherein the method includes receiving the target temperature for the zone through a user interface of a temperature control system.

3. The method of claim 1, wherein the method includes receiving the ambient temperature at the temperature control system from a temperature sensor.

4. The method of claim 1, wherein the method includes:
initializing the regression model by setting $p_2, p_3$, and $p_4$ to zero and entering a cooling rate of the thermal comfort system for $p_1$; and
solving for $t_{pred}$ to obtain an initial calculated cooling time when the zone will reach the target temperature.

5. The method of claim 1, wherein the method includes:
initializing the regression model by setting $p_2, p_3$, and $p_4$ to zero and entering a heating rate of the thermal comfort system for $p_1$; and
solving for $t_{pred}$ to obtain an initial calculated heating time when the zone will reach the target temperature.

6. The method of claim 1, wherein the method includes:
receiving updated values for an actual time for the zone to reach the target temperature, the actual temperature of the zone, and the ambient temperature of air being supplied to the thermal comfort system upon operation of the thermal comfort system.

7. The method of claim 1, wherein the method includes:
solving for $p_1, p_2, p_3$, and $p_4$ using the target temperature for the zone; and
receiving updated values for the actual time for the zone to reach the target temperature, the actual temperature of the zone, and the ambient temperature of air being supplied to the thermal comfort system.

8. The method of claim 7, wherein the method includes updating at least one of the coefficients of the regression model with each run cycle of the thermal comfort system.

9. The method of claim 7, wherein updating at least one of the coefficients of the regression model includes:
determining a covariance matrix for the regression model; and
selecting eigenvalues of the covariance matrix to adjust when at least one of the coefficients of the regression model is updated.

10. The method of claim 9, wherein coefficients of the regression model associated with eigenvalues that are smaller, relative to eigenvalues associated with remaining coefficients of the regression model, are updated later.

11. A machine-readable non-transitory medium storing instructions, executable by a machine to cause the machine to:
receive a target temperature for a zone, an actual temperature of the zone, and an ambient temperature of air being supplied to a thermal comfort system;
initialize a regression model by:
setting a coefficient to zero; and
entering a heating rate of the thermal comfort system;
determine, from the received target temperature for the zone, the actual temperature of the zone, the ambient temperature of air being supplied to the thermal comfort system, and a temperature of a media supplied to the thermal comfort system, a calculated time when the zone will reach the target temperature upon operation of the thermal comfort system;
wherein the calculated time when the zone will reach the target temperature is defined by:

$$t_{pred} = \sum_{i=1}^{nT_a}(T_{aT} - T_a)^i \cdot p_i + \sum_{i=1}^{nT_o}(T_{aT} - T_o)^i \cdot p_{nTa+i} + \sum_{i=1}^{nT_m}(T_{aT} - T_m)^i \cdot p_{nTa+nTo+i} + \sum_{i=1}^{nConst} p_{nTa+nTo+nTm},$$

$t_{pred}$ is the calculated time when the zone will reach the target temperature;
$T_{aT}$ is the target temperature for the zone;
$T_a$ is the actual temperature of the zone;
$T_o$ is the ambient temperature of air being supplied to the thermal comfort system;
$T_m$ is the temperature of media supplied to the thermal comfort system;
$T_{Const}$ is a constant value;
$nT_a, nT_o$, and $nT_m$ are orders of polynomials of the regression model; and
$p_1, p_2, p_3$, and $p_4$ are coefficients of the regression model;
solve for the calculated time when the zone will reach the target temperature in order to obtain an initial calculated heating time for the zone to reach the target temperature;
operate the thermal comfort system for the initial calculated time when the zone will reach the target temperature.

12. The medium of claim 11, wherein the instructions include instructions executable by the machine to determine an initial calculated time when the zone will reach the target temperature by setting $p_{nTa+i}, p_{nTA+nTo+i}$, and $p_{nTa+nTo+nTm}$ to a value of zero and entering at least one of a heating rate and cooling rate of the thermal comfort system for Pi.

13. The medium of claim 12, wherein the instructions include instructions executable by the machine to:
receive updated values for an actual time for the zone to reach the target temperature, the actual temperature of the zone, the ambient temperature of air being supplied to the thermal comfort system, and the temperature of the media supplied to the thermal comfort system; and
solve for $p_i, p_{nTa+i}, p_{nTA+nTo+i}$, and $p_{nTa+nTo+nTm}$ based on the received updated values, using a recursive least squares method.

14. The medium of claim 13, wherein the instructions include instructions executable by the machine to:
determine a covariance matrix for the regression model; and update at least one of the coefficients of the regression model by performing a comparison of a size of eigenvalues in the covariance matrix.

15. The medium of claim 14, wherein the coefficient of the regression model associated with the smallest eigenvalue is updated after the other coefficients of the regression model associated with larger eigenvalues.

16. A system, the system comprising a processing resource in communication with a non-transitory computer-readable medium, wherein the computer-readable medium contains a set of instructions and wherein the processing resource is designed to execute the set of instructions to:
receive a target temperature for a zone, an actual temperature of the zone, and an ambient temperature of air being supplied to a thermal comfort system;
initialize a regression model by:
setting a coefficient to zero; and
entering a heating rate of the thermal comfort system;
determine, from the target temperature for the zone, the actual temperature of the zone, and the ambient temperature of air being supplied to the thermal comfort system, a calculated time when the zone will reach the target temperature upon operation of the thermal comfort system;
wherein the calculated time when the zone will reach the target temperature is defined by:

$$t_{pred} = \sum_{i=1}^{nT_a}(T_{aT} - T_a)^i \cdot p_i + \sum_{i=1}^{nT_o}(T_{aT} - T_o)^i \cdot p_{nT_a+i} +$$

-continued $$\sum_{i=1}^{nT_m}(T_{aT} - T_m)^i \cdot p_{nT_a+nT_o+i} + \sum_{i=1}^{nConst} p_{nT_a+nT_o+nT_m},$$

$t_{pred}$ is the calculated time when the zone will reach the target temperature;

$T_{aT}$ is the target temperature for the zone;

$T_a$ is the actual temperature of the zone;

$T_v$ is the ambient temperature of air being supplied to the thermal comfort system;

$T_m$ is the temperature of media supplied to the thermal comfort system;

$n_{Const}$ is a constant value;

$nT_a$, $nT_o$, and $nT_m$ are orders of polynomials of the regression model; and $p_1$, $p_2$, $p_3$, and $p_4$ are coefficients of the regression model;

solve for the calculated time when the zone will reach the target temperature in order to obtain an initial calculated heating time for the zone to reach the target temperature; and operate the thermal comfort system for the initial calculated time.

17. The system of claim 16, wherein the regression model operates without historical data when measured data is unavailable.

18. The system of claim 17, wherein the regression model is updated with each run cycle of the thermal comfort system.

* * * * *